No. 851,814. PATENTED APR. 30, 1907.
R. LEITZ.
DRAFT APPLIANCE.
APPLICATION FILED MAR. 12, 1906.
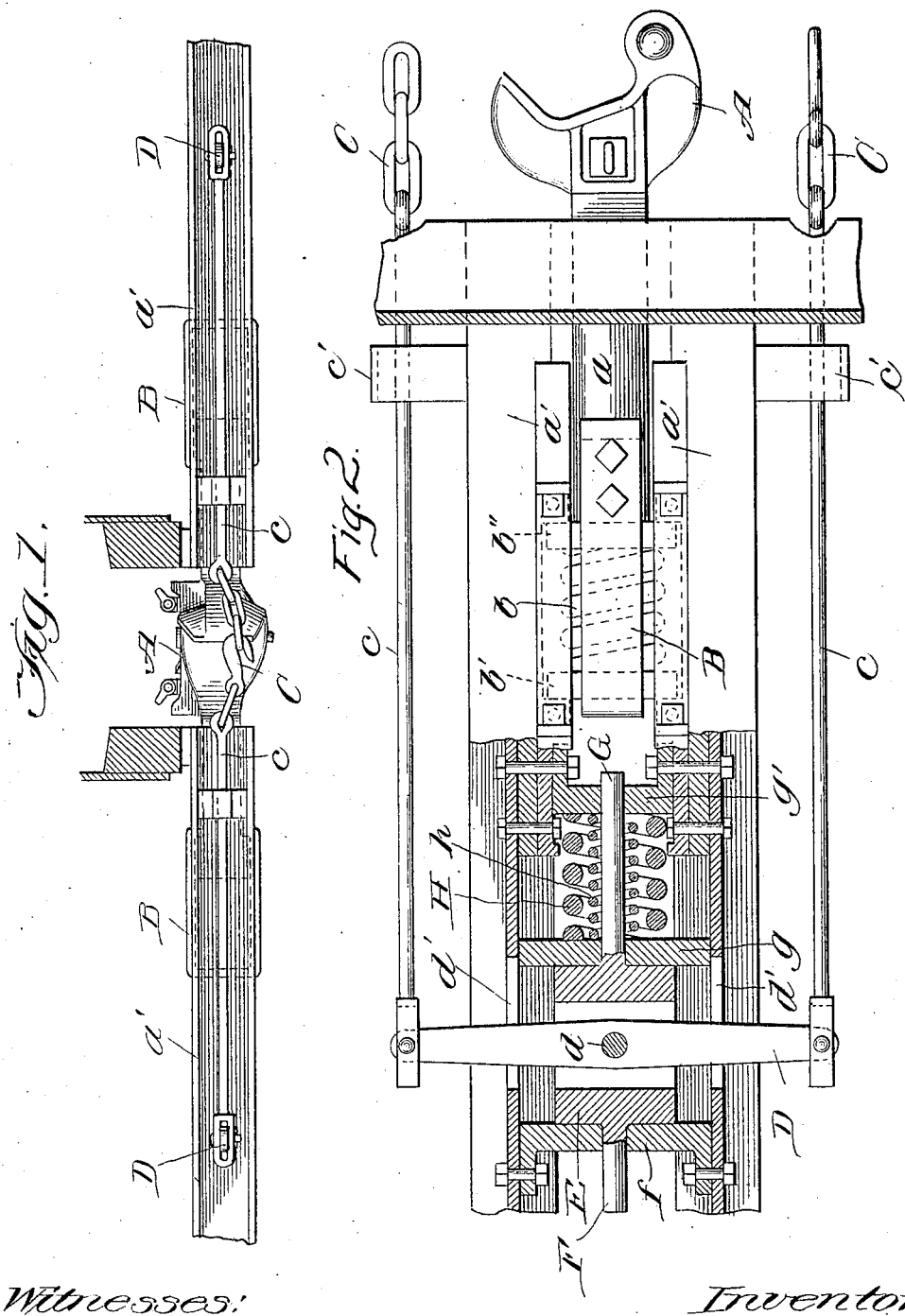

UNITED STATES PATENT OFFICE.

ROBERT LEITZ, OF CHICAGO, ILLINOIS, ASSIGNOR OF ONE-HALF TO FRANK P. COLLIER, OF WILMETTE, ILLINOIS.

DRAFT APPLIANCE.

No. 851,814.  Specification of Letters Patent.  Patented April 30, 1907.

Application filed March 12, 1906. Serial No. 305,589.

*To all whom it may concern:*

Be it known that I, ROBERT LEITZ, a citizen of the United States, residing at Chicago, in the county of Cook and State of Illinois, have invented new and useful Improvements in Draft Appliances, of which the following is a specification.

The object of this invention is to provide a coupling for cars which will operate as an auxiliary to the main coupling on curves and hold the cars together without injury to the cars whenever the main coupling breaks.

A further object of the invention is to yieldably connect the safety chains to the car and provide a device for equalizing the strains thereon.

The invention has other objects in view which will be fully pointed out hereafter in the detailed description.

In the accompanying drawings illustrating one embodiment of the invention Figure 1 is a view partly in section showing my invention applied to portions of two cars coupled together. Fig. 2 is a horizontal sectional view.

The invention is applicable to passenger and freight cars and it can be used in connection with any kind of main coupling. I do not therefore limit the invention to embodiment in a car of any particular construction or with any particular coupling and it will be understood that the drawings are simply intended to show how the invention can be employed.

The coupling A is carried by a draw-bar $a$ which is located between the I-beams $a'$. A strap B is bolted to the rear end of the draw bar and incloses the spring $b$ which is confined between the follower plates $b'$, $b''$. This general construction is a familiar form of coupling and as it constitutes no part of my invention it will not be necessary to go into a more detailed description thereof. The safety chains C are carried by side bars $c$ which operate in guides $c'$ and are pivotally connected to the ends of an equalizing lever D which is pivoted centrally at $d$ in a movable block E located between the I-beams. The ends of the equalizing lever project for a suitable distance through slots $d'$ in the I-beams. A rearwardly extending guide F on the block E operates in a stationary stop plate $f$ fastened to the I-beams and a similar guide G projects forwardly from the block E through a movable plate $g$ and a fixed plate $g'$. An outer spring H and an inner spring $h$ are arranged on the guide G and between the plates $g$ and $g'$.

In practice the safety chains on one car are connected to the safety chains on another car after the cars have been coupled together in the usual manner. In view of the fact that these chains are carried by arms pivotally connected at their ends to a horizontal transverse lever D there will always be a sufficient play of the bars to permit the chains on one car to be easily connected to those on another car and at the same time the chains will be very nearly taut as indicated in Fig. 1. In rounding curves the chains will act as an auxiliary to the main coupling and if the main coupling breaks at any time the chains will hold the cars together and the springs H, $h$, will lessen the shock to the cars.

Heretofore the ordinary safety chains have been connected to the platforms of passenger cars and when the main coupling breaks the strain suddenly put upon these chains is so great that they frequently pull the platforms off the cars. With my invention this cannot occur because the chains are not connected to the platforms but are connected with the I-beams beneath the car. The lever and its yielding buffer constituted by the springs H, $h$, are located a sufficient distance behind the draw bar strap so that there will be room at all times for the strap B and the guide G to operate without interference with each other, and I prefer to locate the stop plate $g'$ as close to the strap B as possible. The chains are coupled so short that if the draw bar should break it will not be permitted to fall out upon the track but by reason of the fact that the cars continue to be held so close together by the chains the broken draw bar will be carried safely in its place and prevented from falling, thereby avoiding the possibility of wrecking the train.

The invention is simple in construction and can be readily and easily applied to all kinds of cars on which safety chains may be used, with such alterations and modifications as will readily occur to skilled mechanics. I desire to have it understood therefore that I do not limit myself to the particular description and arrangement of parts as the same may be changed to meet various conditions without departing from the spirit and scope of the invention.

What I claim and desire to secure by Letters Patent is:—

1. The combination of a pair of safety chains for a railway car, movable supports for said chains, a movable block independent of the main coupling, and a lever pivotally mounted on said block and pivotally connected at its ends to said supports.

2. The combination of a pair of safety chains for a railway car, movable supports for said chains, a yieldably mounted block independent of the main coupling, and a lever carried by said block and pivotally connected at its ends to said supports.

3. The combination of a pair of safety chains for a railway car, movable supports for said chains, a movable block independent of the main coupling, a lever carried by said block and pivotally connected at its ends to said supports, and a spring buffer for said block.

4. The combination of a pair of safety chains for a railway car, rods supporting said chains at their forward ends, a movable block yieldably mounted between said rods, and a lever carried by said block and pivotally connected to the rear ends of said rods.

5. The combination of a pair of safety chains for a railway car, rods supporting said chains at their forward ends, a movable block yieldably mounted between said rods, and a lever pivotally mounted centrally on said block and pivotally connected at its ends to the rear ends of said rods.

6. The combination of a pair of safety chains for a railway car, movable supports for said chains, a block movably mounted between said supports and independent of the main coupling, a lever carried by the block and pivoted at its ends to said supports, and means for guiding said block.

7. The combination of a pair of safety chains for a railway car, movable supports for said chains, a movable block arranged between the supports, a lever pivotally mounted on said block and pivotally connected at its ends to said supports, and a spring buffer located in front of said block.

8. The combination of a pair of safety chains for a railway car, a pair of rods carrying said chains at their forward ends, a block movably mounted between said rods, a lever pivotally mounted on said block and pivotally connected at its ends to the rear ends of said rods, fixed guide plates in front of and behind said block, and guides on the block operating in said guide plates.

9. The combination of a pair of safety chains for a railway car, rods carrying said chains at their forward ends, a block movably mounted between the rods, a lever pivotally mounted on said block and pivotally connected at its ends to the rear ends of said rods, a stationary guide plate in rear of the block, a guide on the block operating in said guide plate, a movable plate, a stationary guide plate in front of the block, a guide on the block operating in said plates, and a spring located between the two plates in front of the block.

ROBERT LEITZ.

Witnesses:
FRANK P. COLLIER,
M. A. KIDDIE.